United States Patent [19]
Spillman et al.

[11] Patent Number: 5,360,678
[45] Date of Patent: Nov. 1, 1994

[54] HIGH ENERGY DENSITY PRESSURE TOLERANT CELL

[75] Inventors: David M. Spillman, Buffalo; Steve J. Ebel, Tonawanda; William D. K. Clark, East Amherst, all of N.Y.

[73] Assignee: Wilson Greatbatch Ltd., Clarence, N.Y.

[21] Appl. No.: 963,580

[22] Filed: Oct. 19, 1992

[51] Int. Cl.$^5$ .............................................. H01M 2/40
[52] U.S. Cl. ............................................ 429/6; 429/70
[58] Field of Search ................................ 429/6, 53, 70

[56] References Cited

U.S. PATENT DOCUMENTS

| | | | |
|---|---|---|---|
| 1,575,226 | 1/1924 | Pichler . | |
| 3,391,029 | 7/1968 | Orsino | 136/166 |
| 3,514,341 | 5/1968 | Cook | 136/166 |
| 3,589,940 | 6/1971 | Bridge et al. | 429/6 |
| 3,809,581 | 5/1974 | Hutchison | 136/161 |
| 4,087,590 | 5/1978 | Kraft | 429/6 |
| 4,109,062 | 8/1978 | McCartney et al. | 429/6 |
| 4,237,197 | 12/1980 | Hart | 429/70 X |

Primary Examiner—Stephen Kalafut
Attorney, Agent, or Firm—Hodgson, Russ, Andrews, Woods & Goodyear

[57] ABSTRACT

A pressure tolerant high energy density battery (10) is described. The battery has a metal casing (12) having a pressure compensating means in the form of bellows (30) comprising a plurality of successive convolutions individually welded to one end of the battery opposite a terminal conductor (20). The conductor is mounted on the header (18) by a glass seal (22) and the active components for the battery comprise a cathode means (34) preferably made of either carbon or fluorinated carbon (CFx) and a binder sheeted on a metal foil and an anode means (36) preferably made by laminating battery grade lithium onto metal grids. A separator (38) is provided between the active battery components and the electrodes and separator are rolled into a spirally wound type formation and housed inside the battery, supported above the bellows. The casing is then preferably filled with a suitable liquid electrolyte comprising gamma butyrolactone having an electrolyte salt in a Li/CFx battery and chlorinated sulfuryl chloride in a Li/CSC battery, and hermetically sealed. A vent (32) is preferably provided to relieve pressure inside the battery.

14 Claims, 5 Drawing Sheets

HIGH ENERGY DENSITY PRESSURE TOLERANT CELL

This invention was made with Government support under Contract N60921-90-C-0226 awarded by the Department of Navy. The Government has certain rights in the invention.

BACKGROUND OF THE INVENTION

This invention relates to high energy density electric cells or batteries and more particularly to pressure-compensation for high energy density batteries. With the continuous development of high energy density battery systems, these electric cells or batteries are being used in applications that place ever greater demands on the electrical power output and discharge life of the battery. In other words, high energy density batteries are being used in hostile environments for which the batteries may not normally be suited. Examples of these applications include, but are not limited to, use in sonobuoys, mines, transponders, surveillance systems, and vehicles.

The high energy high density electric cell of the present invention is contained in a casing having a hermetically integral flexible mechanical pressure-compensation device, such as a bellows. The pressure-compensation device is provided on one end of the cell casing which is hollow and preferably made of a stainless steel material. The mechanical pressure-compensation device is preferably made of a similar material and makes use of the compressibility of the material contained inside the cell casing to effect internal pressure compensation. This material may comprise a liquid and/or vapor and/or gas phase and may, but does not need, to serve as the electrolyte and/or catholyte of the cell. The cell may also have a pressure-relief component such as a pressure-relief vent. This is dependent upon the specific application for which the cell or battery is intended. If a pressure-relief vent is used, it is preferably mounted in the bottom of the bellows. Further, the header assembly at the other end of the cell casing may have a glass-to-metal seal as the pressure-relief component. In this case, the pressure-relief vent may not be necessary. Instead, pressure-relief will take place through the header of the cell. Whether or not a pressure-relief component is included with the mechanical pressure-compensating device, it should be understood that the resultant cell container is an integral unit that retains hermeticity, which is especially important in a lithium cell system.

PRIOR ART

Heretofore, in applications where a battery is subjected to extremely high pressure such as occur in deep ocean environments where water pressure approaches 10,000 psia at depths of 25,000 feet and is capable of rendering the cell or battery inoperable, a heavy walled protective container or housing mounted around the battery has often been used. In particular, lead-acid and silver-zinc battery systems that are used in deep ocean environments have been protected in this manner. While this type of protection is sufficient to the extent that the cell or battery remains operable, these heavy walled containers reduce the gravimetric energy density (watt-hours per unit weight) and volumetric energy density (watt-hours per unit volume) of the battery, which results in a decrease in the performance of the associated equipment.

Other pressure-compensation devices have generally comprised a movable compensator that expands and contracts in response to pressure changes. Accordingly, U.S. Pat. No. 3,391,029 to Orsino discloses a liquid electrolyte battery having a casing designed for underwater operation, in particular at substantial depths. This casing has a pressure-compensation bottom wall comprised of a plurality of corrugations, bellows or diaphragms that function to equilibrate the pressure on the cell, particularly, in an underwater environment. The casing, including the pressure-compensating bottom wall, is made from a plastic material, such as polyolefins and preferably polyethylene. These plastics are inert to battery electrolytes and provide a liquid-tight enclosure for the battery. However, this plastic battery casing and pressure-compensating device is not particularly adapted for use in an environment where oxyhalide electrolytes, organic electrolytes or airtight hermeticity is required, as in the present case with a lithium battery.

U.S. Pat. No. 3,514,341 to Cook describes a modified cell casing for a liquid electrolyte battery having a cylinder mounted on the casing. Housed in the cylinder is a piston which moves in response to changes in the ambient pressure thereby functioning to equilibrate the cell pressure with the environment. This can be for both increases and decreases in pressure, such as are encountered in a high altitude environment. In addition, the cell is equipped with a one-way pressure-relief valve which allows gas generated within the cell to vent. The cell container is described as being made of a rigid or semi-rigid plastic, neoprene, rubber or metal material. The cylinder for the piston is described as preferably being constructed of a tetrafluoroethylene material. These materials are not particularly suitable for a battery casing that needs to be hermetically airtight.

U.S. Pat. No. 3,809,581 to Hutchison discloses a long-term deep-submergence power supply having a layer of dielectric oil provided above the electrolyte. The dielectric oil traps gaseous material when the cell is under pressure. The casing for the power supply includes ports which function to vent pressure and an equilizing bladder that compresses to equalize internal pressure with outside pressure. This external bladder system is not particularly adapted for use in an airtight hermetically sealed battery application. Also, the pressure-compensating dielectric oil may be orientation dependent.

U.S. Pat. No. 4,087,590 to Kraft discloses a pressure-compensation device mounted externally on a battery cell. The pressure-compensation device consists of a reservoir holding a fluid electrolyte along with a diaphragm. When the battery cell is exposed to deep-sea pressure, the diaphragm forces electrolyte solution from the reservoir through tubing and into the battery cell, thereby equilizing the internal pressure. The problem is that an electrically conductive path can form between adjacent cells through the tubing. To avoid this, the tubing is described as having a length that is as large as possible to avoid a discharge of current between the cells. The tubing length provides a conductor path having a resistance sufficient to counteract the discharge current. The present invention does not require such a system.

Of general interest to the present invention is U.S. Pat. No. 1,575,226 to Pichler which discloses a wall for vessels subjected to exterior pressure wherein the walls are comprised of a series of juxtaposed curved units with trough or groove-shaped outer surfaces, there being no mention in this patent of batteries.

In contrast to the prior art electrical cell pressure-compensation devices, the pressure-tolerant cell of the present invention provides a pressure-compensating device that is a hermetically integral part of the battery container. The specific form of the pressure-compensating mechanism may include, but is not limited to, the use of bellows, domes, diaphragms, or bladders that serve to equalize the internal pressure inside the cell with the surrounding environment by changing the internal volume of the cell container in response to the environment. The use of a bellows may be particularly favorable because bellows are responsive to both increases or decreases in pressure. As an example, if an increase in the pressure of the environment surrounding the cell occurs, such as in deep ocean use, the bellows contracts causing an increase in the internal pressure inside the cell. This pressure increase continues until the internal pressure inside the cell and the external pressure of the environment equilibrate. At that time, no net pressure forces will exist on the cell container. Conversely, if the environmental pressure decreases, such as in high altitude applications, the bellows will expand, causing a decrease in the internal cell pressure. This pressure decrease continues until the internal pressure of the cell and the external pressure of the environment equilibrate. Again, no net pressure forces will exist on the cell container. In either situation, the means for pressure equilibration through mechanical compensation makes use of both the flexible mechanical element, which is an integral part of the cell casing, and the compressibility of the material held inside the cell container, which may include the electrolyte and/or catholyte of the cell.

Since the pressure-compensation device of the present invention is an integral part of the battery casing, the overall size of the battery is reduced with respect to the particular equipment or device the battery is intended to power. The need for high-power energy sources that are lightweight and/or have relatively small volumes for a given amount of power/energy makes lithium cells or batteries a preferred choice. However, the mechanical pressure-compensation device of the present invention is not limited to use in lithium cells, but is applicable in a general sense to any solid or liquid cathode cell or battery. More specifically the anode material need not be comprised solely of lithium but may consist of lithium alloys, sodium, potassium, calcium, magnesium, or any alkali metal or alkali-earth metal capable of functioning as an anode. In addition, the electrical cell can be a solid cathode cell having, but not limited to, cathodes such as manganese dioxide, silver vanadium oxide, titanium disulfide, copper oxide, copper sulfide, iron sulfide, iron disulfide, and fluorinated carbon, or the electrical cell can comprise a liquid cathode cell and contain catholytes such as sulfur dioxide or oxyhalides including phosphoryl chloride, thionyl chloride and sulfuryl chloride used individually or in combination with each other or in combination with halogens, interhalogens or other electrochemical promoters or stabilizers.

The mechanical pressure-compensation device of the present invention is also not limited to active batteries which are considered to be disposable following the completion of a single discharge of their active components. The present pressure-compensation device may be used with secondary batteries which can be discharged and recharged many times before disposal of the battery becomes necessary and with reserve battery types where the electrical cell is activated when it is to be used.

Finally, in certain applications, electrical cells and batteries may be required to contain a safety device for relieving internal pressure inside the cell when this pressure exceeds the ambient pressure in the operating environment by a predetermined range. Such a safety device may include, but is not limited to, the use of a vent or a stress point in the cell casing or a header assembly that is designed to rupture at a specific pressure. In a lithium cell a pressure-rated header assembly would include a glass-to-metal seal that ruptures at a predetermined pressure range.

OBJECTS

It is an object of this invention to provide a new and improved high energy density pressure-tolerant cell.

It is another object of the present invention to provide a hermetically integral pressure-compensation device for a high energy density battery.

It is a further object of the present invention to provide such a hermetically integral pressure-compensation device for high energy batteries in which said device does not have any functional components external to the battery or its housing.

Further, it is an object of the present invention to provide a pressure-compensation device, such as a bellows assembly, that is suitable for maintaining pressure equilibrium between the internal cell volume and the ambient environment in a high energy density battery.

Still further, it is an object of the present invention to provide a pressure-tolerant cell having an aqueous or non-aqueous electrolyte and either a solid or liquid cathode system and including a pressure-compensation device such as a hemetically integral bellows assembly that maintains pressure equilibrium between the internal cell volume and the ambient environment.

Furthermore, it is an object of the present invention to provide a pressure-tolerant solid cathode Li/fluorinated carbon (Li/CFx) cell or battery wherein the energy delivered during discharge, as measured by voltage and capacity, is largely insensitive to changes in pressure and orientation.

Further, it is an object of the present invention to provide a pressure-tolerant liquid oxyhalide Li/chlorinated sulfuryl chloride (Li/CSC) cell or battery wherein the energy delivered during discharge, as measured by voltage and capacity, is largely insensitive to changes in pressure and orientation.

Finally, it is an object of the present invention to provide a high energy density cell or battery having a hermetically integral pressure-compensation device that is suitable for use in a deep ocean environment and that further includes a pressure-relief device.

These and other objects will become increasingly apparent to one of ordinary skill in the art by reference to the following drawings and to the description.

DETAILED DESCRIPTION

Figure 1:
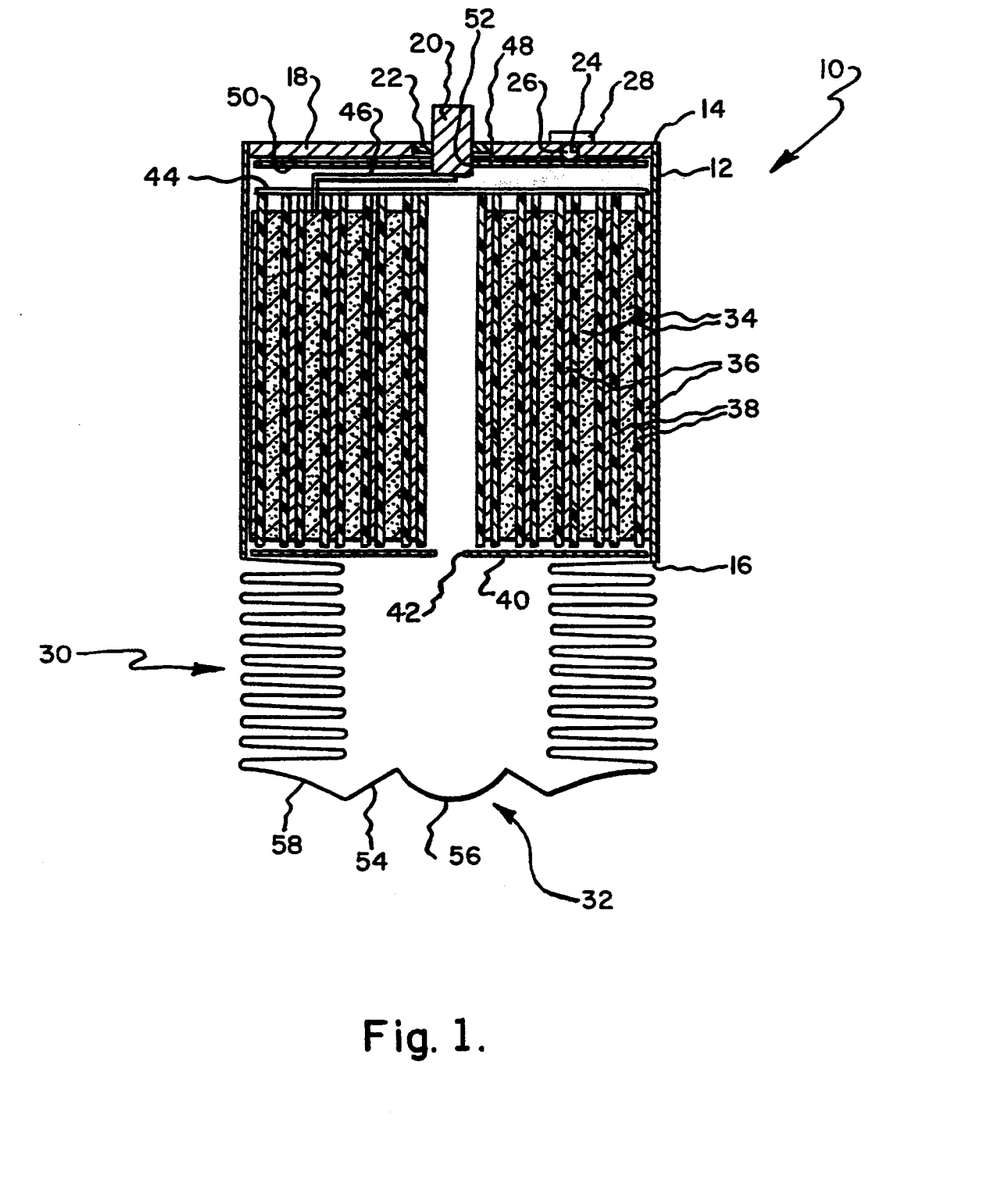
FIG. 1 is a cross-sectional view of a battery according to the present invention and having means for pressure compensation.

Referring now to FIG. 1, there is shown a battery 10 according to the present invention for delivering high current and energy at elevated pressures and at high altitudes and low pressures. Battery 10 includes a hollow, cylindrical casing 12 having upper and lower ends 14 and 16 as viewed in FIG. 1. Casing 12 is closed at the upper end 14 by a lid or header 18 welded in place in a known manner. Casing 12 is formed of metal, preferably 304, 304L, 316 or 316L stainless steel, and being electrically conductive provides one terminal or contact for making electrical connection between the battery 10 and its load. Header 18 also is of stainless steel. The other electrical terminal or contact is provided by a conductor or pin 20 extending from within battery 10 through casing 12, in particular through header 18. Conductor 20 is insulated electrically from the metal header 18 by a glass seal 22 which will be described in detail presently. A fill opening 24 in lid 18 is closed by a ball 26 and cap 28 in a manner which will be described.

Battery 10 is provided with pressure-compensation means in the form of bellows 30 extending from the lower end 16 of casing 12 in successive convolutions until the desired compensation volume is achieved. The lowermost or outer convolution is then provided with a vent element 32 which will be described. Bellows 30 is integral with casing 12, for example being of metal and welded thereto.

The battery 10 of the present invention further includes cathode means 34 in casing 12 and lithium anode means 36 separated from the cathode means 34 by separator material 38. The battery 10 shown is of spirally wound configuration. The cathode active material 34 is preferably fabricated by sheeting a mixture of fluorinated carbon and polytetrafluoroethylene binder onto an expanded metal foil. The anode current collector 36 is made by laminating battery grade lithium onto metal grids. The separator 38 provided between the anode and cathode current collectors is made from two layers of a nonwoven glass fiber hydrocarbon or fluorocarbon polymer paper.

A plastic insulator plate 40 having a centrally located opening 42 is located inside the casing 12 resting on the bellows 30. The two electrodes and separator paper are then wound together in a spiral or jellyroll type formation and placed inside the casing 12 resting on the insulator plate 40 which supports the battery material and prevents the wound anode-cathode subassembly from telescoping downward into the bellows 30.

A cell insulating plastic cover 44 having the shape of a circular plate is placed on top of the spirally wound subassembly, resting on the upper edges of the separator material 38. An electrical lead 46 is fitted through an opening in insulating cover 44 with one end in electrical contact with the cathode current collector 34 and the other end extending to conductor 20 mounted in glass seal 22.

Seal 22 surrounds conductor 20 to prevent contact between the conductor 20 and header 18. In the manufacturing process, the seal 22 is formed as a ring member that is fitted inside an opening 48 in header 18 with the conductor 20 received inside the ring. When used in Li/CSC cell, this assembly is heated in an atmosphere of argon and dissociated ammonia to a temperature of about 1075° C. for about 15 to about 20 minutes to melt the glass and form the seal 22. Preferably, conductor 20 and seal 22 are of corrosion resistant pin-glass combination such as 52 alloy and Mansol Type 79 glass. When used in a Li/CFx cell, this assembly is heated in a nitrogen atmosphere at a suitable temperature for a suitable period of time to melt the glass and form the seal 22. Preferably, conductor 20 and seal 22 are of corrosion resistant pin-glass combination such as E-brite and Fusite 435 glass. Conductor 20 carries a plastic plate 50 having an opening 52 that is substantially equal to the diameter of conductor 20 to receive plate 50 in a snug-fitting relationship, the plate 50 serving to insulate electrical lead 46 from header 18.

A liquid electrolyte material comprises gamma a suitable electrolyte salt in butyrolactane for a Li/CFx cell or a suitable electrolyte salt prepared in-situ in sulfuryl chloride with gaseous chlorine added for a Li/CSC cell. The electrolyte is introduced into casing 12 through fill opening 24. Ball 26, which is preferably made of polytetrafluoroethylene having a diameter substantially equal to that of opening 24, is snugly fitted into place and cap 28 is welded to header 19. Cap 28 is preferably a circular member made of metal such as stainless steel.

Vent 32 is provided to relieve pressure inside battery 10 if a net pressure build up occurs that is greater than that which can be compensated for by bellows 30. Vent 32 comprises a metal disc having a downwardly and outwardly tapering frusto-conical portion 54 extending from an upper edge of an inverted hemispherical portion 56. The lower edge of frusto-conical portion 54 is welded to a washer 58 which, in turn, is welded to the lowermost convolution of bellows 30.

It should be appreciated that the terms upper, lower, downward, and outward are not meant as limiting terminology, but are only used to indicate orientation of the battery 10 as shown in FIG. 1. The battery 10 is intended to function for its intended purpose independent of its spatial orientation.

The present invention is illustrated further by the following examples.

EXAMPLE 1

In order to determine if pressure compensation using a device such as bellows 30 is required for operation of lithium cells in an elevated pressure environment, three assemblies, meant to simulate lithium cells, with various design features were evaluated under 10,000 psia external pressure. None of these assemblies contained a bellows for pressure compensation. The first assembly simply involved the welding of a header onto an empty case. The second assembly involved the construction of an inert cell that contained a wound formation of carbon cathode and separator paper. This assembly was filled with a quantity of CSC electrolyte which resulted in a 5 to 10 percent void volume as might normally be found in a lithium cell. The final assembly also involved the manufacture of an inert cell that contained a wound formation of carbon cathode and separator paper. This assembly differed from the second in that the simulated cell was completely filled with CSC electrolyte so as to offer the greatest resistance to crushing.

These assemblies were then subjected to an elevated pressure of 10,000 psia. The glass-to-metal seals were compromised and hermeticity was lost in each of the three assemblies. This occurred at an external pressure of 400 psia for the empty casing, 400 psia for the second assembly containing the inert wound formation of carbon and separator paper and which had 5 to 10 percent void volume, and at 3,200 psia for the third casing containing an inert wound formation of carbon and separator paper and which had no void volume. As evidenced by this test, pressure compensation is required for operation of lithium cells in environments where an external pressure greater than about 3,200 psia is expected.

EXAMPLE 2

Fifteen cell housings similar to housing 12 described herein were purchased from Pacific Scientific, Belfab Division. The housings purchased consisted of a cylindrical casing having an outer diameter of 1.000 inch, a length of 1.000 inch, and a wall thickness of 0.019 inch. Bellows similar to bellows 30 were welded individually to one end of the casing in successive convolutions or layers until the desired compensation volume was achieved. A diaphragm was used to seal the assembly. Each bellows assembly was hermetic to helium gas flow at a rate of $1 \times 10^{-8}$ cm$^3$/sec. The pressure-tolerant cases were constructed of 316L stainless steel. The assembly used for Li/CFx cells contained 10 individual bellows convolutions which provided 2.0 cm$^3$ of volume in addition to the volume provided in the straightwall portion of the cell. This additional volume is sufficient to provide 20 percent excess electrolyte for pressure compensation. The assembly used for Li/CSC cells included bellows similar to bellows 30 having forty individual convolutions which provided 9.0 cm$^3$ of volume in addition to the volume provided in the straightwall portion of the cell. The additional volume was sufficient to provide 108 percent excess electrolyte for pressure compensation. This large compensation volume was used because the CSC electrolyte is involved in a chemical reaction during cell discharge and the volume change associated with this reaction is not completely understood. A header similar to header 18 was welded at the other end of the casing to close the assemblies. The header was constructed of 316L stainless steel and had a thickness of 0.062 inch.

Two designs were tested with the bellows assemblies for Li/CFx cells. In the first design, assemblies identified herein as Cell Numbers 62103 and 62104, were filled completely with gamma butyrolactone containing a suitable electrolyte salt and the assemblies were oriented in a manner with the header facing upward. The gamma butyrolactone CFx assemblies were inserted and sealed inside a pressure reactor and the pressure was then increased to 12,000 psia at a rate of approximately 1,000 psia/minute until the test pressure was reached. The test pressure was maintained throughout the 30-minute test time.

In the second design, assemblies, identified herein as Cell Numbers 62106, 62107, and 62108, were used to simulate an actual pressure-tolerant Li/CFx cell without actually using lithium. Two insulators similar to insulator plate 40 with a ¼-inch diameter hole removed from their centers were placed into the case in a position resting on the bellows. An inert wound formation of fluorinated carbon and separator paper was then inserted into the case and two additional insulators similar to insulating cover 44 were placed above the inert wound formation. A header similar to header 18 was welded at the other end of the casing to close the assemblies. The assemblies were filled with gamma butyrolactone containing a suitable electrolyte salt and were then subjected to 12,000 psia external pressure from 1 to 18 hours. Two of the assemblies were tested when oriented with the header facing downward and one was tested when oriented with the header facing upward. No detrimental effects in the pressure-compensation means were observed for any of the assemblies after exposure to the elevated pressure environment.

EXAMPLE 3

In a similar manner to that of Example 2, two designs were tested with the bellows assemblies for Li/CSC cells. In the first design, assemblies identified herein as Cell Numbers 62116 and 62117 were filled completely with sulfuryl chloride and the assemblies were oriented in a manner such that the header faced upward. These assemblies were then subjected to 12,000 psia external pressure for 30 minutes.

In the second design, assemblies identified herein as Cell Numbers 62110, 62111, 62113 and 62114 were used to simulate an actual pressure-tolerant Li/CSC cell without using lithium. These assemblies were constructed in a similar manner as Cell Numbers 62106, 62107 and 62108 used in the second design in Example 2 and had an inert wound formation of carbon and separator paper. After being filled with CSC containing a suitable electrolyte salt prepared in-situ, the assemblies were subjected to 12,000 psia external pressure for 1 to 24 hours. Two of the assemblies were tested when oriented with the header facing downward and two were tested when oriented with the header facing upward.

All the pressure-tolerant Li/CFx and Li/CSC assemblies tested in Examples 2 and 3 were subjected to destructive analysis. The headers were removed and no damage to any of the headers or glass-to-metal seals was observed through visual inspection under a microscope and dye penetration leak test. All bellows were observed to remain hermetic. Inspection of the inert wound components in those assemblies which had them revealed no crushing of the electrodes or violation of the separator paper and all internal welds were completely intact.

EXAMPLE 4

Seven pressure-tolerant Li/CFx cells, identified herein as Cell Numbers 63399, 63400, 63401, 63402, 63403, 63404 and 63405, were fabricated with the housing made according to that described in the second design of Example 2. Ten bellows convolutions were used for pressure compensation. A spirally wound construction was used for the active components. Battery grade lithium was laminated onto metal grids to form the anode current collector. The cathode current collector was fabricated by sheeting a mixture of fluorinated carbon and polytetrafluoroethylene binder onto an expanded metal foil. The separator was a nonwoven glass fiber paper and two layers were used to separate the anode and cathode current collectors. The cells were filled with gamma butyrolactone containing a suitable electrolyte salt and were hermetically sealed by welding a stainless steel ball over the fill hole. The open circuit voltage of the cells was in the range 3.349 to 3.478 volts and weight of each cell was in the range of 37.0 to 37.9 grams. This is shown in Table 1.

TABLE 1

| Cell Number | Open Circuit Voltage (volts) | Weight (grams) |
| --- | --- | --- |
| 63399 | 3.349 | 37.9 |
| 63400 | 3.431 | 37.1 |
| 63401 | 3.450 | 37.1 |
| 63402 | 3.478 | 37.1 |
| 63403 | 3.446 | 37.6 |
| 63404 | 3.444 | 37.1 |
| 63405 | 3.386 | 37.0 |

Polarization measurements of pressure-tolerant Li/CFx cells were made at various pressures and under various loads. Loads were applied at pressures of 0, 500, 2,000, 6,000 and 10,000 psia. The resistance of the discharge loads, when combined with the 6.6-ohm internal resistance of the test system, measured 106.6 ohms, 46.9 ohms, 26.8 ohms and 16.7 ohms, respectively. In each case, the cells were tested in a vertical orientation with the header facing upward. The pressure was increased incrementally at a rate of 1,000 psia/minute throughout the range cited. As each discharge load was applied, the voltage was measured and recorded. Following the final reading at 10,000 psia, the pressure in the system was increased to 11,000 psia and maintained at this level for 15 minutes. It was then decreased to 10,000 psia. The polarization measurements were repeated until atmospheric pressure was reached. Throughout this portion of the study, the pressure was decreased at a rate of 1,000 psia/minute. The cells were allowed to partially recover between the application of discharge loads and changes in pressure.

An internal voltage rise during discharge is characteristic of the Li/CFx electrochemical system. To prevent this voltage rise from influencing the voltages observed in the polarization measurements, two pressure-tolerant Li/CFx cells, Cell Numbers 63400 and 63403, were partially discharged for 150 minutes under a 20-ohm load to a region where the discharge profile was reasonably flat. The open circuit voltage of each cell was allowed to recover for a minimum of 20 hours prior to use of the cell in the polarization test. Polarization measurements were then recorded at several pressures in the range of 14.7 to 10,000 psia.

Figure 2:
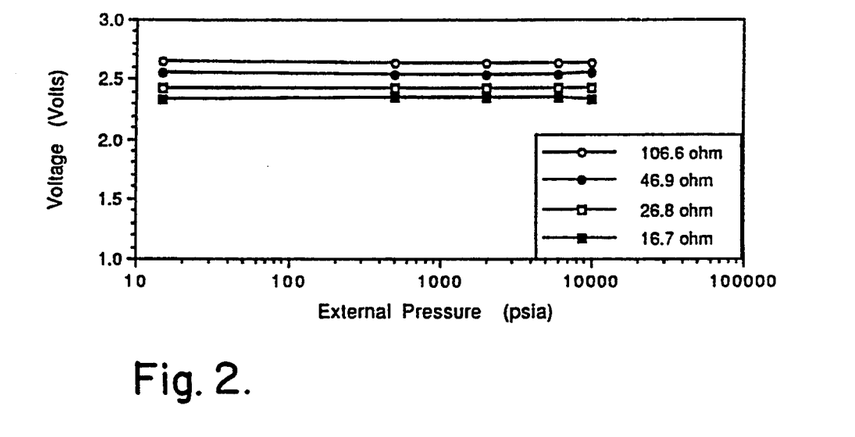
FIG. 2 shows pulse polarization curves of the pressure tolerant Li/CFx cells according to the present invention under various discharge loads.
Figure 3:
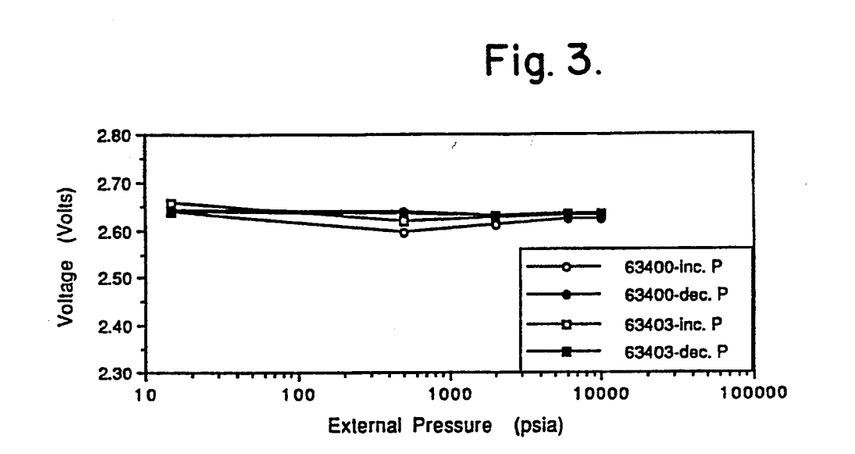
FIGS. 3 to 6 are graphic representations of pulse polarization curves of pressure tolerant Li/CFx cells according to the present invention.
Figure 4:
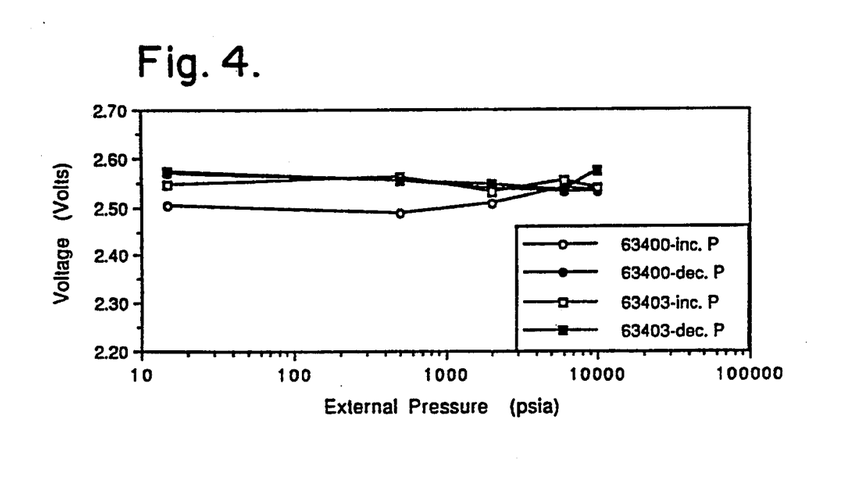
Figure 5:
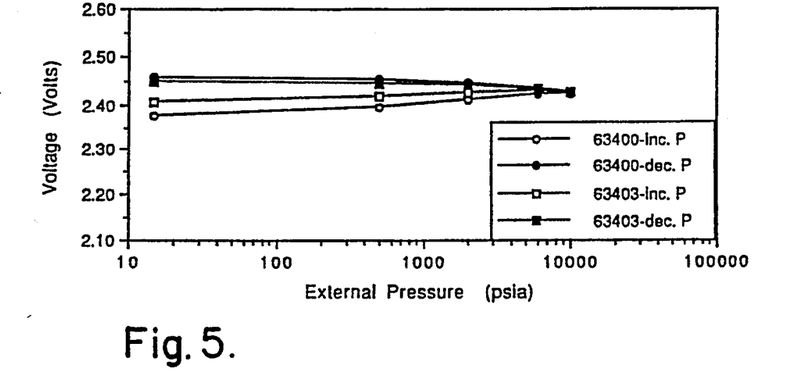
Figure 6:
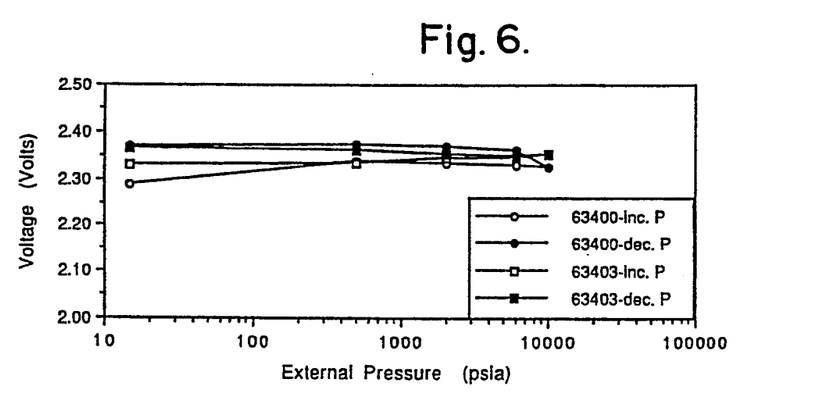

The polarization measurements obtained with these two cells are tabulated in Table 2. The summary results are depicted graphically in FIG. 2 and the individual results for each cell under the discharge loads tested and with the cells subjected to both increasing pressure (inc. P) and decreasing pressure (dec. P) are shown in FIGS. 3 through 6. In that respect, the cells shown in FIG. 3 were discharged under a 106.6 ohm load, the cells shown in FIG. 4 were discharged under a 46.9 ohm load, the cells shown in FIG. 5 were discharged under a 26.8 ohm load and the cells shown in FIG. 6 were discharged under a 16.7 ohm load.

The voltage of pressure-tolerant Li/CFx cells is essentially constant in the pressure range 14.7 to 10,000 psia under all discharge loads evaluated. As the pressure applied to each cell is increased and then decreased, the variation in pulse voltage is usually greater within individual cells than it is between cells. No definitive voltage hysteresis is present. At higher external pressures, the voltage is usually observed to increase slightly. Also, under any particular discharge load and pressure, the voltage is usually higher as the pressure is increased in comparison to when it is decreased; however, this is not always the case and the difference is often 100 millivolts or less.

TABLE 2

| Pressure (psia) | Test Load (ohms) | Voltage (volts) | |
| --- | --- | --- | --- |
| | | Cell 63400 | Cell 63404 |
| 14.7 | 106.6 | 2.636 | 2.655 |
| | 46.9 | 2.504 | 2.545 |
| | 26.8 | 2.374 | 2.408 |
| | 16.7 | 2.285 | 2.331 |
| 500 | 106.6 | 2.596 | 2.627 |
| | 46.9 | 2.488 | 2.560 |
| | 26.8 | 2.396 | 2.419 |
| | 16.7 | 2.336 | 2.335 |
| 2,000 | 106.6 | 2.610 | 2.624 |
| | 46.9 | 2.507 | 2.530 |
| | 26.8 | 2.409 | 2.427 |
| | 16.7 | 2.335 | 2.346 |
| 6,000 | 106.6 | 2.623 | 2.631 |
| | 46.9 | 2.539 | 2.551 |
| | 26.8 | 2.421 | 2.429 |
| | 16.7 | 2.330 | 2.345 |
| 10,000 | 106.6 | 2.623 | 2.633 |
| | 46.9 | 2.532 | 2.537 |
| | 26.8 | 2.420 | 2.427 |
| | 16.7 | 2.325 | 2.353 |
| 10,000 | 106.6 | 2.621 | 2.633 |
| | 46.9 | 2.532 | 2.574 |
| | 26.8 | 2.420 | 2.424 |
| | 16.7 | 2.325 | 2.354 |
| 10,000 | 106.6 | 2.628 | 2.633 |
| | 46.9 | 2.529 | 2.534 |
| | 26.8 | 2.433 | 2.432 |
| | 16.7 | 2.360 | 2.350 |
| 2,000 | 106.6 | 2.631 | 2.631 |
| | 46.9 | 2.539 | 2.546 |
| | 26.8 | 2.445 | 2.440 |
| | 16.7 | 2.369 | 2.353 |
| 500 | 106.6 | 2.638 | 2.635 |
| | 46.9 | 2.554 | 2.554 |
| | 26.8 | 2.452 | 2.446 |
| | 16.7 | 2.374 | 2.360 |
| 14.7 | 106.6 | 2.643 | 2.639 |
| | 46.9 | 2.568 | 2.572 |
| | 26.8 | 2.456 | 2.450 |
| | 16.7 | 2.369 | 2.363 |

EXAMPLE 5

Figure 7:
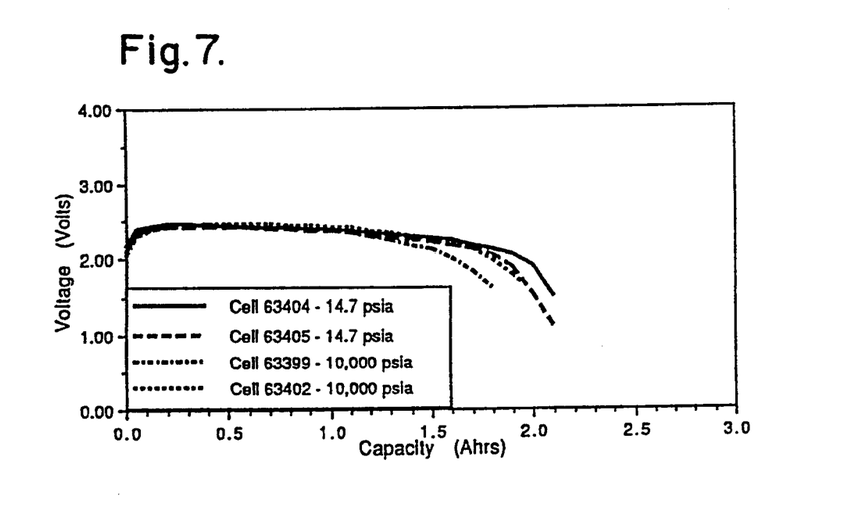
FIG. 7 is a graphic representation of the discharge profile of a number of pressure tolerant Li/CFx cells according to the present invention.

Four pressure-tolerant Li/CFx cells described in Example 4 were then prepared for discharge testing. Two pressure-tolerant Li/CFx cells, Cell Numbers 63404 and 63405, were successfully discharged under a 20.0-ohm load at room temperature and 14.7 psia external pressure in an orientation with the header facing upward. This was done to confirm that pressure-tolerant Li/CFx cells were functional at atmospheric pressure. The discharge profiles for these two cells are shown in FIG. 7. The profiles are characteristic of the Li/CFx system in that the voltage rose initially and slowly decreased throughout the remainder of the discharge period. The cells operated in the range 2.35 to 2.40 volts and delivered approximately 2.00 to 2.10 Ahrs of capacity to 1.70 volts. At atmospheric pressure, the gravimetric energy density was determined to be 127 to 134 Whrs/kg and the volumetric energy density was calculated as 0.27 to 0.28 Whrs/cm$^3$.

Two pressure-tolerant Li/CFx cells were successfully discharged under a 26.8-ohm load at room temperature and 10,000 psia external pressure. Cell Number 63399 was discharged when oriented with the header facing upward and Cell Number 63402 was discharged when oriented with the header facing downward. The discharge profile of these cells is also shown in FIG. 7 and are nearly identical to those obtained for pressure-tolerant Li/CFx cells discharged at atmospheric pressure. These cells discharged in the range of 2.40 to 2.45 volts and delivered approximately 1.90 Ahrs capacity to 1.70 volts. The gravimetric energy density was slightly lower at 116 to 125 Whrs/kg and the volumetric energy density was calculated as 0.26 to 0.27 Whrs/cm$^3$. There was no reduction in voltage or capacity attributable to vertical orientation effects. Under high pressure discharge, an energy reduction of 2 to 13 percent was calculated. Whether this was attributable to the influence of high pressure on the discharge kinetics or was inherent in the differences between the cells cannot be statistically discerned with the small number of cells tested.

Table 3 shows details relating to the operating voltage, capacity, energy, gravimetric energy density and volumetric energy density of all the pressure-tolerant Li/CFx cells.

TABLE 3

| Cell Number | Voltage (volts) | Capacity (Ahrs) | Energy (Whrs) | Energy Density (Whrs/kg) | Energy Density (Whrs/cm$^3$) |
| --- | --- | --- | --- | --- | --- |
| 63404 | 2.38 | 2.10 | 5.00 | 134.7 | 0.28 |
| 63405 | 2.35 | 2.02 | 4.75 | 128.3 | 0.27 |
| 63399 | 2.40 | 1.86 | 4.46 | 117.5 | 0.25 |
| 63402 | 2.45 | 1.93 | 4.73 | 127.4 | 0.26 |

EXAMPLE 6

Eight pressure-tolerant Li/CSC cells, identified herein as Cell Numbers 63406, 63407, 63408, 63409, 63410, 63411, 63412 and 63413, were fabricated for testing. These cells were constructed in a manner similar to the cells described in the second design of Example 2, except that these cells were provided with forty bellows convolutions for pressure compensation. A spirally wound construction was used for the active components. Battery grade lithium was laminated onto metal grids to form the anode current collector. The cathode current collector was fabricated by sheeting a mixture of carbon and polytetrafluoroethylene binder onto an expanded metal foil. The separator was a nonwoven glass fiber paper and two layers were used to envelop the cathode current collector. The CSC catholyte was prepared by forming a suitable electrolyte salt in-situ in sulfuryl chloride and gaseous chlorine was added to this solution. Seven of the cells were filled with this electrolyte while the eighth cell, Number 63406, was filled with an electrolyte which was diluted by a factor of ten with pure sulfuryl chloride. The eighth cell was fabricated in this manner in order that the current carrying capability be reduced in the event that an internal short circuit occurred. For safety reasons, this cell was designated as the first to be tested under elevated pressure. The open circuit voltage and weight of each cell was measured and recorded and this is shown in Table 4. The open circuit voltage of each cell containing the standard electrolyte was in the range 3.932 to 3,935 volts and the weight of each cell was in the range 66.1 to 67.4 grams. The open circuit voltage of the cell containing the diluted low salt electrolyte was 3.928 volts and the weight of this cell was 65.2 grams.

TABLE 4

| Cell Number | Open Circuit Voltage (volts) | Weight (grams) |
| --- | --- | --- |
| 63406* | 3.928 | 65.2 |
| 63407 | 3.932 | 67.4 |
| 63408 | 3.935 | 66.9 |
| 63409 | 3.935 | 66.6 |
| 63410 | 3.934 | 66.1 |
| 63411 | 3.933 | 66.2 |
| 63412 | 3.934 | 67.0 |
| 63413 | 3.933 | 66.4 |

*Cell 63406 contained electrolyte with a low salt concentration.

Two of the pressure-tolerant Li/CSC cells, Cell Numbers 63408 and 63413, were used in a polarization study. A slight voltage decrease during the initial stages of discharge is often observed in the Li/CSC electrochemical system. To prevent this voltage decrease from influencing the voltages observed in the polarization measurements, these cells were partially discharged at room temperature for 90 minutes under a 20-ohm load to a region where the discharge profile is reasonably flat. The open circuit voltage of each cell was allowed to recover for a minimum of 20 hours prior to use of the cell in the polarization study.

Polarization measurements on pressure-tolerant Li/CSC cells were nearly identical to those performed on Li/CFx cells. The various loads were applied at pressures of 14.7, 500, 2,000, 6,000, and 10,000 psia. The resistance of the discharge loads when combined with the 6.6-ohm internal resistance of the test system, measured 106.6 ohms, 46.9 ohms, 26.8 ohms, and 16.7 ohms, respectively. In each case, the cell was tested in a vertical orientation with the header facing upward. The pressure was increased incrementally throughout the range cited. As each discharge load was applied, the voltage was measured and recorded on a strip chart. The voltage was corrected for internal resistance in the manner discussed previously in this example. Following the final reading at 10,000 psia, the pressure in the test system was increased to 11,000 psia and maintained at this level for 15 minutes. The pressure was then decreased to 10,000 psia. The polarization measurements were repeated until atmospheric pressure was reached. The cells were allowed to partially recover between the application of discharge loads and changes in pressure.

Figure 8:
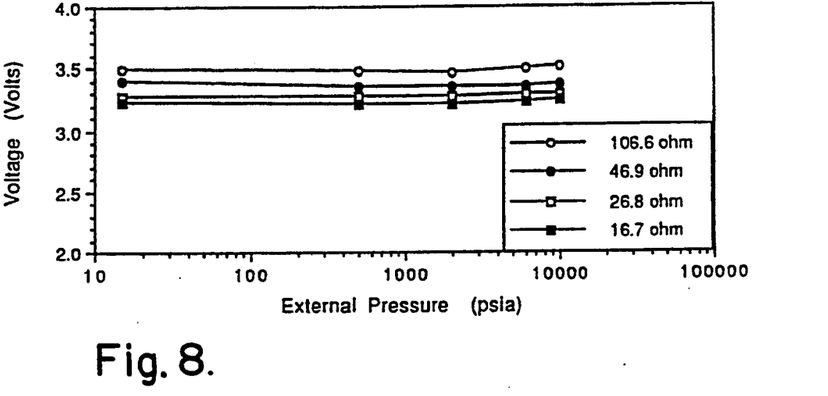
FIG. 8 shows pulse polarization curves of pressure tolerant Li/CSC cells according to the present invention under various discharge loads.
Figure 9:
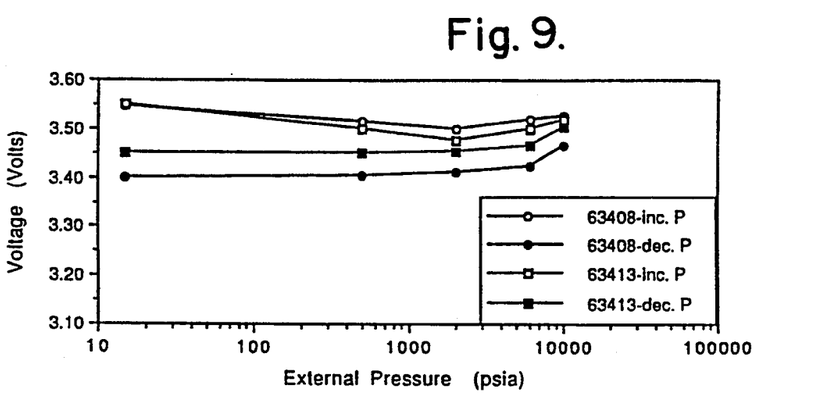
FIGS. 9 to 12 are graphic representations of pulse polarization curves of pressure tolerant Li/CSC cells according to the present invention.
Figure 10:
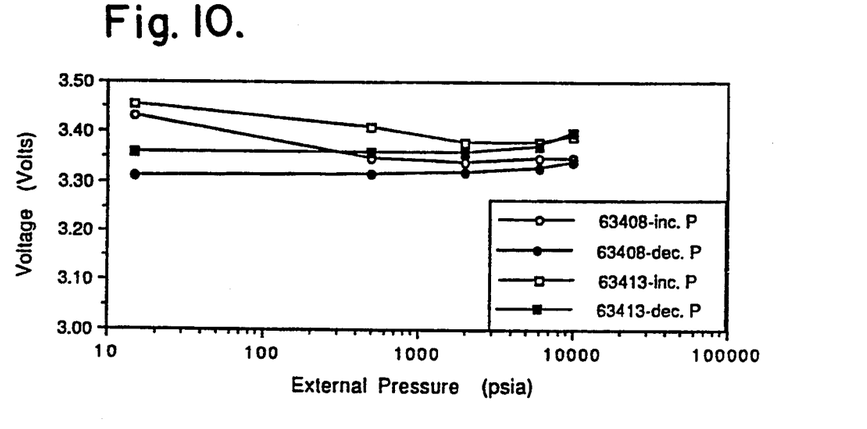
Figure 11:
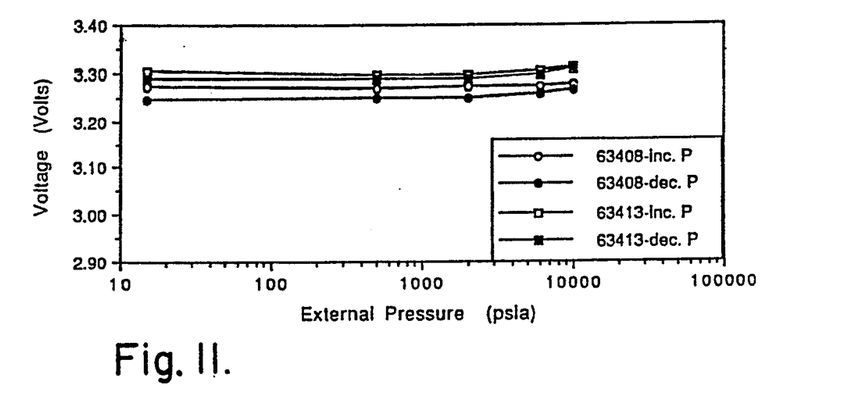
Figure 12:
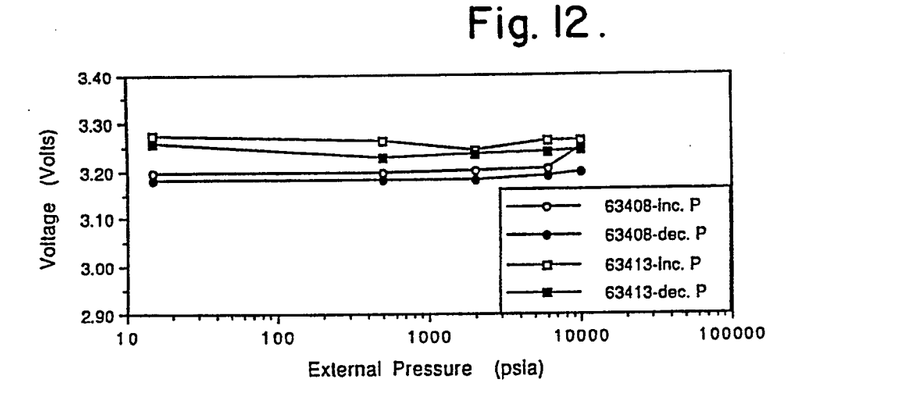

The polarization measurements obtained with Cell Numbers 63408 and 63413 are tabulated in Table 5 and the summary results are depicted graphically in FIG. 8 and the individual results for each cell under the various discharge loads tested and with the cells subjected to both increasing pressure (inc. P) and decreasing pressure (dec. P) are shown in FIGS. 9 through 12. In that respect, the cells shown in FIG. 9 were discharged under a 106.6 ohm load, the cells shown in FIG. 10 were discharged under a 46.9 ohm load, the cells shown in FIG. 11 were discharged under a 26.8 ohm load and the cells shown in FIG. 12 were discharged under a 16.7 ohm load.

TABLE 5

| Pressure (psia) | Test Load (ohms) | Voltage (volts) Cell 63408 | Voltage (volts) Cell 63413 |
| --- | --- | --- | --- |
| 14.7 | 106.6 | 3.546 | 3.548 |
|  | 46.9 | 3.430 | 3.455 |
|  | 26.8 | 3.272 | 3.305 |
|  | 16.7 | 3.194 | 3.274 |
| 500 | 106.6 | 3.515 | 3.500 |
|  | 46.9 | 3.345 | 3.406 |
|  | 26.8 | 3.270 | 3.297 |

TABLE 5-continued

| Pressure (psia) | Test Load (ohms) | Voltage (volts) Cell 63408 | Voltage (volts) Cell 63413 |
|---|---|---|---|
|  | 16.7 | 3.196 | 3.262 |
| 2,000 | 106.6 | 3.498 | 3.476 |
|  | 46.9 | 3.336 | 3.375 |
|  | 26.8 | 3.272 | 3.297 |
|  | 16.7 | 3.199 | 3.241 |
| 6,000 | 106.6 | 3.518 | 3.498 |
|  | 46.9 | 3.344 | 3.375 |
|  | 26.8 | 3.274 | 3.304 |
|  | 16.7 | 3.202 | 3.261 |
| 10,000 | 106.6 | 3.526 | 3.519 |
|  | 46.9 | 3.346 | 3.387 |
|  | 26.8 | 3.276 | 3.309 |
|  | 16.7 | 3.246 | 3.259 |
| 10,000 | 106.6 | 3.464 | 3.505 |
|  | 46.9 | 3.336 | 3.396 |
|  | 26.8 | 3.266 | 3.306 |
|  | 16.7 | 3.193 | 3.241 |
| 6,000 | 106.6 | 3.420 | 3.463 |
|  | 46.9 | 3.327 | 3.367 |
|  | 26.8 | 3.257 | 3.297 |
|  | 16.7 | 3.186 | 3.239 |
| 2,000 | 106.6 | 3.409 | 3.451 |
|  | 46.9 | 3.318 | 3.358 |
|  | 26.8 | 3.250 | 3.289 |
|  | 16.7 | 3.180 | 3.234 |
| 500 | 106.6 | 3.404 | 3.450 |
|  | 46.9 | 3.314 | 3.356 |
|  | 26.8 | 3.248 | 3.286 |
|  | 16.7 | 3.181 | 3.226 |
| 14.7 | 106.6 | 3.400 | 3.450 |
|  | 46.9 | 3.309 | 3.356 |
|  | 26.8 | 3.245 | 3.286 |
|  | 16.7 | 3.180 | 3.226 |

The voltage of each pressure-tolerant Li/CSC cell tested in this example was essentially constant in the pressure range 14.7 to 10,000 psia under all discharge loads evaluated. As the pressure applied to each cell was increased and then decreased, the variation in pulse voltage was usually greater within individual cells than it was between cells. No definitive voltage hysteresis was present. At higher external pressures, the voltage was usually observed to increase slightly. Also, the voltage was usually higher as the pressure was increased in comparison to when it was decreased; however, this was not always the case and the difference was often 100 millivolts or less.

EXAMPLE 7

Figure 13:
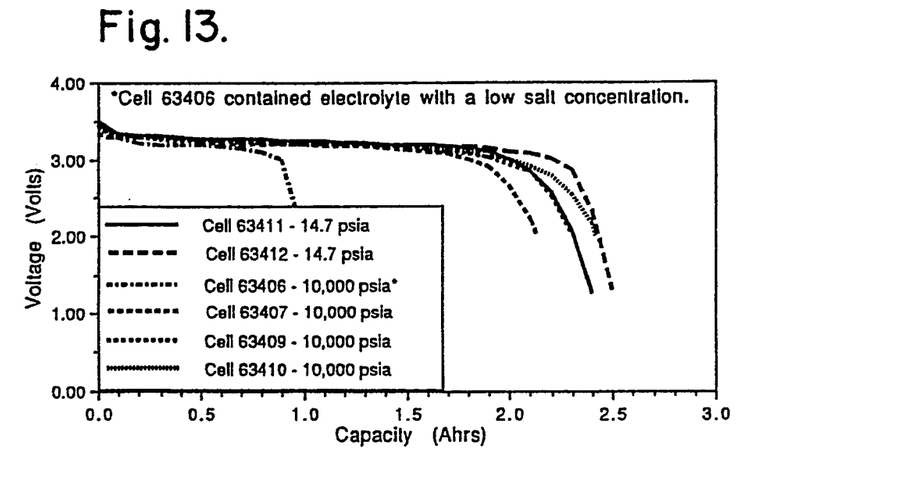
FIG. 13 is a graphic representation of the discharge profile of a number of pressure tolerant Li/CSC cells according to the present invention.

Six of the pressure-tolerant Li/CSC cells described in example 6 were then prepared for discharge testing. In order to confirm that pressure-tolerant Li/CSC cells are functional at atmospheric pressure, two pressure-tolerant Li/CSC cells, Cell Numbers 63411 and 63412, were discharged under a 20.0-ohm load at room temperature and 14.7 psia external pressure with the header oriented facing upward. The discharge profiles for these two cells are shown in FIG. 13 and are characteristic of the Li/CSC system in that the voltage dropped slightly and then remained steady throughout the remainder of the discharge period. The cells operated at 3.20 volts and delivered approximately 2.35 to 2.50 Ahrs of capacity to 2.00 volts. At atmospheric pressure, the gravimetric energy density was determined to be 114 to 119 Whrs/kg and the volumetric energy density was calculated as 0.21 to 0.22 Whrs/cm$^3$.

FIG. 13 also shows the discharge profile of Cell Number 63406, which as discussed earlier, contained a reduced salt concentration in the electrolyte since it was designated as the first to be tested at elevated pressure. The cell was discharged under a 26.8-ohm load at room temperature and 10,000 psia external pressure with the header facing upward. The discharge profile is similar to that observed with cells discharged at atmospheric pressure. The operating voltage was 3.17 volts and the reduced capacity of 1.03 Ahrs to 2.00 volts was attributable to the low salt concentration in the electrolyte. Accordingly, the gravimetric energy density of 48 Whrs/kg and the volumetric energy density of 0.09 Whrs/cm$^3$ was considerably less than that achieved with other pressure-tolerant Li/CSC cells.

Three of the pressure-tolerant Li/CSC cells were successfully discharged under a 26.8-ohm load at room temperature and 10,000 psia external pressure. Cell Numbers 63407 and 63410 were discharged while oriented with their headers facing upward and cell 63409 was discharged while oriented with its header facing downward. The discharge profile for these cells are also shown in FIG. 13, and once again, the discharge profiles at 10,000 psia external pressure are nearly identical to those obtained for pressure-tolerant Li/CSC cells discharged at atmospheric pressure. All these cells discharged in the range 3.15 to 3.20 volts and delivered approximately 2.15 to 2.40 Ahrs capacity to 2.00 volts. The gravimetric energy density was slightly lower at 101 to 114 Whrs/lb and the volumetric energy density was calculated as 0.21 to 0.26 Whrs/cm$^3$. Once again, there was no reduction in voltage or capacity attributable to vertical orientation effects. Under high pressure discharge, an energy reduction of 0 to 15 percent was calculated and, as was observed in Example 5 with the pressure-tolerant Li/CFx cells, this may have been attributable to elevated pressure or to differences which are inherent between cells. With the small number of cells built and tested, this difference cannot be statistically discerned.

Additional details concerning the operating voltage, capacity, energy, gravimetric energy density and volumetric energy density of all the pressure-tolerant Li/CSC cells tested are provided in Table 6.

TABLE 6

| Cell Number | Voltage (volts) | Capacity (Ahrs) | Energy (Whrs) | Energy Density (Whrs/kg) | Energy Density (Whrs/cm$^3$) |
|---|---|---|---|---|---|
| 63411 | 3.21 | 2.37 | 7.61 | 114.8 | 0.21 |
| 63412 | 3,20 | 2.49 | 7.97 | 119.0 | 0.22 |
| 63406* | 3.17 | 1.03 | 3.26 | 50.0 | 0.09 |
| 63407 | 3.17 | 2.16 | 6.85 | 101.6 | 0.26 |
| 63409 | 3.18 | 2.29 | 7.28 | 109.3 | 0.20 |
| 63410 | 3.17 | 2.41 | 7.64 | 115.5 | 0.21 |

*Cell 63406 contained electrolyte with a low salt concentration.

After pressure testing was completed, all the pressure-tolerant Li/CFx and Li/CSC cells were subjected to destructive analysis. The headers were removed and no damage to any of the headers or glass-to-metal seals was observed through visual inspection under a microscope and dye penetration leak test. Visual inspection of the bellows showed no signs of leakage or structural compromise. Inspection of the wound assembly of each cell revealed no crushing of the electrodes or violation of the separator paper and all internal welds were completely intact.

One of the many potential uses of pressure-tolerant lithium cells is in deep ocean salt water environments. In order to prevent a cell from discharging through the salt water, it is essential to isolate one or both of the electrical terminals. One way in which this may be accomplished is through the use of conformal coatings.

It is therefore apparent that the present invention accomplishes its objectives. It is however intended that the foregoing description be only representative of the present invention, the scope of which is defined by the hereinafter appended claims.

What is claimed is:

1. In an electrochemical cell comprising an anode, a cathode and an operatively associated electrolyte, the improvement which comprises:
   (a) housing means of fluid impervious material and including a surrounding sidewall that extends to an open end with the sidewall enclosing and surrounding at least a portion of the anode and cathode;
   (b) compensating means of a fluid impervious material hermetically connected to the open end of the housing means as an integral unit to enclose an internal volume inside the cell at an ambient pressure; and
   (c) fluid filled in the electrochemical cell and selected from the group consisting of the electrolyte and a catholyte, wherein the compensating means provides for volume compensating movement in response to a change in the ambient pressure to effect a responsive change in the internal volume that acts on the fluid filled in the cell to thereby provide an equilibrating pressure inside the electrochemical cell in response to the ambient pressure change and independent of the spatial orientation of the cell.

2. The electrochemical cell of claim 1 wherein the compensating means is a bellows means joined to the housing means in a hermetic manner.

3. The electrochemical cell of claim 2 wherein the bellows means are comprised of a pleated sidewall that is hermetically joined to the sidewall of the housing means.

4. The electrochemical cell of claim 1 wherein the sidewall of the housing means is provided with a second end having a hermetically sealed closure means serving to close the second end, and wherein the closure means has an opening that is in a sealed relationship with an insulator means for a cell terminal.

5. The electrochemical cell of claim 4 wherein the insulator means is a glass seal.

6. The electrochemical cell of claim 1 wherein the housing means and the compensating means are each made of a metal material and are welded together to form the hermetic relationship between the compensating means and the housing means.

7. The electrochemical cell of claim 6 wherein the metal material comprising the housing means and the compensating means is selected from the group consisting of stainless steel and titanium.

8. The electrochemical cell of claim 1 further comprising a vent means that serves to vent the internal pressure inside the electrochemical cell when the internal pressure exceeds a threshold.

9. The electrochemical cell of claim 1 wherein the compensating means is bellows means comprised of a pleated sidewall that is hermetically formed to the sidewall of the housing means and wherein the electrochemical cell is provided with a vent means that serves to vent the internal pressure inside the cell when the internal pressure exceeds a threshold and wherein the vent means is provided in an end wall that closes the pleated sidewall of the bellows means, spaced from the sidewall of the housing means.

10. The electrochemical cell of claim 1 wherein the anode is selected from the group consisting of lithium, a lithium alloy, sodium, potassium, calcium and magnesium.

11. The electrochemical cell of claim 1 wherein the cathode is selected from the group consisting of manganese dioxide, fluorinated carbon, silver vanadium oxide, titanium disulfide, copper oxide, copper sulfide, iron sulfide and iron disulfide.

12. The electrochemical cell of claim 1 wherein the liquid catholyte is selected from the group consisting of sulfur dioxide and an oxyhalide including phosphoryl chloride, thionyl chloride and sulfuryl chloride used individually or in combinations thereof, or used with halogens, interhalogens, electrochemical promoters or stabilizers.

13. The electrochemical cell of claim 1 provided as a Li/CFx system comprising lithium as the anode, fluorinated carbon as the cathode and gamma butyrolactone having a suitable electrolyte salt as the electrolyte.

14. The electrochemical cell of claim 1 provided as a Li/CSC system comprising lithium as the anode, carbon as the cathode and chlorinated sulfuryl chloride having a suitable electrolyte salt as the electrolyte.

* * * * *